July 15, 1969 G. V. WOODLING 3,455,617
AXIAL FIXATION POSITIONAL MEANS FOR A PAIR OF TAPERED
ROLLER BEARINGS
Original Filed May 10, 1967
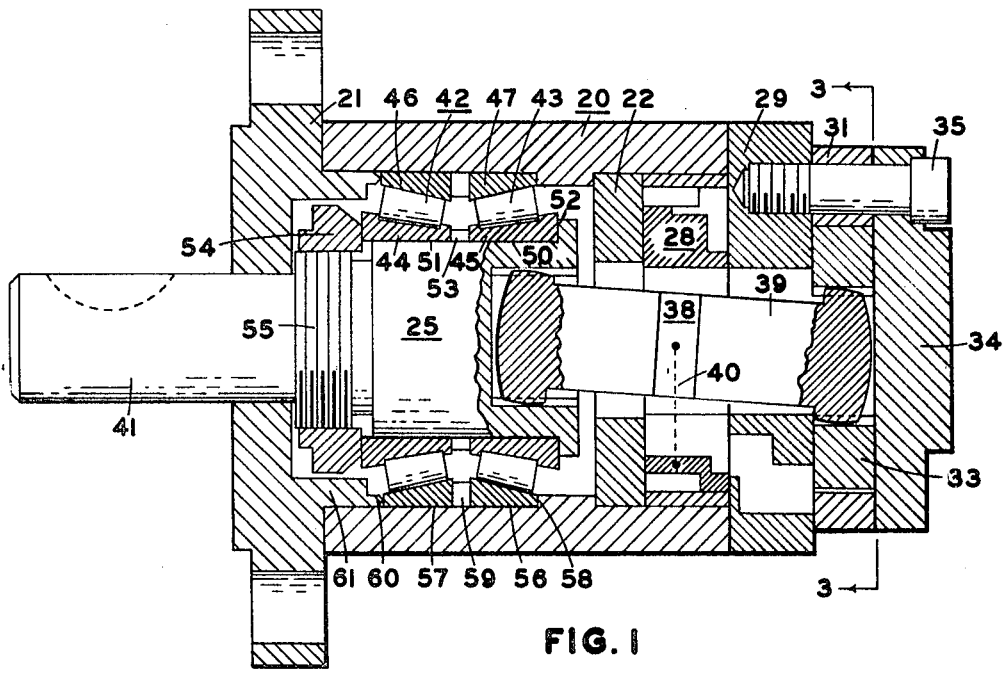
FIG. I
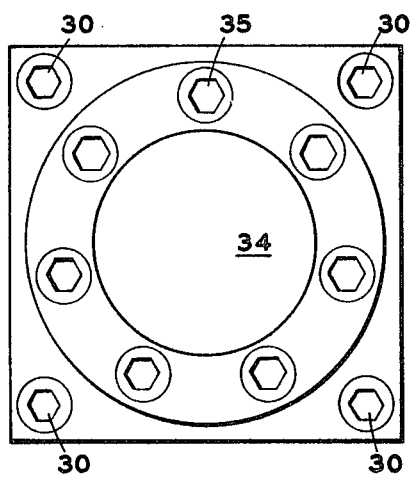
FIG.2
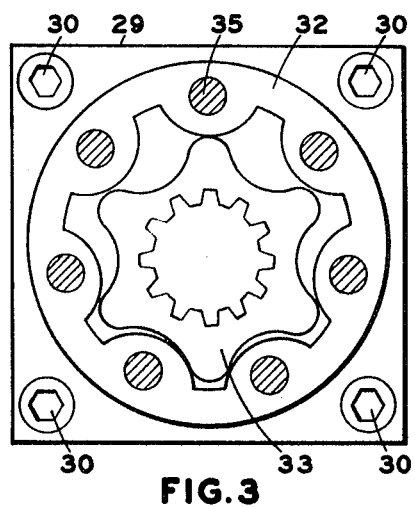
FIG.3
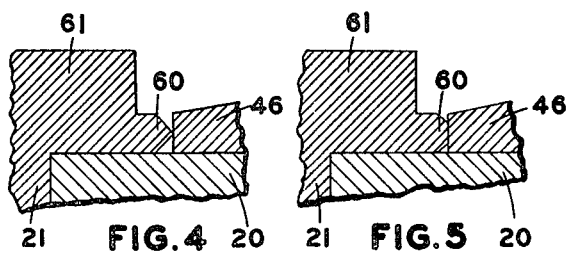
FIG.4  FIG.5
INVENTOR.
GEORGE V. WOODLING
BY
Woodling, Krost, Granger and Rust
attys United States Patent Office 3,455,617
Patented July 15, 1969

3,455,617
AXIAL FIXATION POSITIONAL MEANS FOR A PAIR OF TAPERED ROLLER BEARINGS
George V. Woodling, 22077 W. Lake Road,
Rocky River, Ohio 44116
Original application May 10, 1967, Ser. No. 637,382, now Patent No. 3,405,603. Divided and this application Nov. 9, 1967, Ser. No. 681,666
Int. Cl. F16c *13/00, 33/00, 35/00*
U.S. Cl. 308—207                              3 Claims

ABSTRACT OF THE DISCLOSURE

A pair of first and second tapered roller bearings is held against axial movement by axial fixation positional means. The pair of tapered roller bearings is mounted between a shaft and an internal bore in a surrounding housing. The first tapered roller bearing has a first cone mounted on a first portion of the shaft and a first cup mounted in a first portion of the bore. The second tapered roller bearing has a second cone mounted on a second portion of the shaft and a second cup mounted in a second portion of the bore. A shaft spacer separates the cones on the shaft and a bore spacer separates the cups in the bore. The shaft has a shoulder against which the first cone axially abuts. A threaded nut on the shaft axially presses against the second cone and secures the cones with the shaft spacer therebetween on said shaft against axial movement. The bore has a bore shoulder against which the first cup axially abuts. The axial fixation positional means abuts against the second cup and secures the cups with the bore spacer therebetween in the bore against axial movement. The axial fixation positional means accommodates for axial tolerance in matching the position of the second cup in the bore.

---

My invention relates to axial fixation means for fixing the axial position of a pair of tapered roller bearing means located between a shaft and a housing surrounding the shaft.

This application is a division of my application, Ser. No. 637,382, filed May 10, 1967 entitled Fluid Pressure Device and Valve System Therefor With Improved Valve Drive Mechanism, now Patent No. 3,405,603.

Although not limited thereto, my invention will be illustrated as being embodied in a fluid pressure device having a shaft mounted within a housing.

An object of my invention is the provision of fixing the axial position of a pair of tapered roller bearing means located between a shaft and a housing surrounding the shaft.

Another object is to provide for accommodating axial tolerances in the mounting of a pair of tapered roller bearings to achieve a fixed axial location for the bearings.

Another object is the provision of a main shaft which is capable of withstanding a heavy load.

Another object is the provision of axial fixation means to secure the bearings in a fixed axial location and to accommodate for axial tolerances in mounting the bearings in the housing.

Other objects and a fuller understanding of this invention may be had by referring to the following description and claims, taken in conjunction with the accompanying drawings, in which:

FIGURE 1 is a longitudinal sectional view of a fluid pressure device embodying my invention, the view being taken through the vertical center thereof;

FIGURE 2 is a view of the right-hand end of FIGURE 1;

FIGURE 3 is a view taken along the line 3—3 of FIGURE 1, showing a stator-rotor mechanism;

FIGURE 4 is an enlarged fragmentary cross-sectional view of the bearing fixation means in FIGURE 1 to accommodate for axial tolerances in matching the position of the bearing in the bore of the housing, the view showing the position of the parts before engagement of the fixation means; and FIGURE 5 is a view similar to FIGURE 4, but showing the position of the parts after engagement of the fixation means.

For clarity of the invention, the usual shaft and static seals are not shown. Also, all wear parts are made of hardenable or bearing metal and are well lubricated by the operating fluid.

With references to the drawing, my invention comprises generally a main housing 20 having substantially a square cross-section. A mounting flange 21 may be secured to the left-hand end of the housing by means of suitable screws (not shown). The housing 20 is hollow from end-to-end, and intermediate the ends of the hollow housing, there is provided a bushing 22 which generally separates the hollow housing into a left-hand end compartment and a right-hand end compartment. Rotatively mounted in the left-hand end compartment is a main shaft 25 having an axis substantially coinciding with the longitudinal fixed axis of the fluid pressure device. A rotary valve 28 is mounted in the right-hand end compartment and is adapted for rotational movement about the fixed axis. On the right-hand end of the hollow housing, there is mounted a square stationary valve member 29 by means of screws 30. Attached to the right-hand face of the stationary valve member 29, is a stator-rotor mechanism 31 comprising a stator element 32 and a rotor element 33. An end cap 34 encloses the stator-rotor mechanism. The stator-rotor mechanism 31 and the end cap 34 are secured to the stationary valve member 29 by means of screw 35.

The valve system, which comprises the stationary valve member 29 and the rotary valve member 28, is independently mounted between the main shaft 25 and the stator-rotor mechanism 31, and thus the rotary valve 28 is free from both the radial thrust and the end thrust to which the main shaft may be subjected. The rotary valve 28 is adapted to be rotated about the fixed axis relative to the stationary valve member by universal drive means, indicated by the dotted line 40 and includes an intermediate shaft portion 38 of an actuating shaft 39 which drivingly interconnects the rotor element 33 to the right-hand end of the main shaft 25.

The main shaft 25 comprises an enlarged internal portion having a reduced external portion 41 extending axially outwardly of the main housing 20 through the mounting flange 21. The enlarged internal portion of the main shaft is supported preferably by tapered roller bearings 42 and 43, respectively, having inner cones 44 and 45 and outer cups 46 and 47. The tapered roller bearings are disposed side-by-side with the bearing 42 disposed oppositely to that of the tapered roller bearing 43. Thus, the tapered roller bearings 42 and 43, in combination with each other, provide for radial thrust as well as for end thrust in both axial directions, with the tapered roller bearing 42 disposed to take the greater part of the radial load. The enlarged internal portion of the main shaft 25 is provided with a first portion 50 upon which the inner cone 45 is pressed and a second portion 51 upon which the inner cone 44 is pressed. The portion 50 terminates into a shoulder 52 against which the right-hand end of the inner cone 45 abuts. The two inner ends of the cones 44 and 45 are separated by a shaft spacer ring 53. Mounted against the left-hand end of the inner cone 44 is a tightening nut 54 which threadably engages male threads 55 provided on a reduced stepped portion of the shaft. Upon tightening the nut 54, the two cones 44 and 45 with the shaft spacer ring 53 therebetween are secured against axial movement upon the main shaft. The tightening nut 54 may be provided with a built-in locking feature to prevent loosening.

The internal surface of the left-hand end compartment of the hollow housing 20 is provided with a first bore portion 56 into which the outer cup 47 is pressed and a second bore portion 57 into which the outer cup 46 is pressed. The bore portion 56 terminates into a shoulder 58 against which the right-hand end of outer cup 47 abuts. The two inner ends of the cups 46 and 47 are separated by a bore spacer ring 59. As shown in FIGURES 1, 4 and 5, the outer cup 46 is secured against axial movement to the left by axial fixation means, indicated by the reference character 60. The axial fixation means 60 comprises an annular V-shaped or pointed rib which axially abuts against the outer cup 46. The rib may be provided on the projecting end of a cylindrical body 61 which may be constructed either integrally with or as a separate part from the flange 21. By pressing the flange 21 against the end of the housing 20 during assembly, the pointed rib is coined against the outer cup 46, with the result that the fixation means accommodates for axial tolerance in matching the position of the cup 46 in the bore of the housing 20. The pressure required to coin the axial fixation means is greater than the end-wise thrust load to which the bearing means 42 may be subjected in operation, in which case the outer cup 46 is resisted against axial movement to the left. In assembly, the axial fixation means is axially fixable (coinable) and is disposed to resist an axial thrust load to which the bearing means 42 may be subjected in operation. The FIGURE 4 shows the axial fixation means 60 before it is coined or fixed and the FIGURE 5 shows the axial fixation means after it has been coined. The main shaft is entirely supported by the two tapered roller bearings 42 and 43. The reduced external shaft portion 41 where it passes axially through the end mounting flange 21 is not journalled therein but rotates therein with a small radial clearance which is adapted to be sealed off by suitable shaft seal means, not shown. The tapered roller bearing assembly is claimed to be new and novel to the extent that the respective inner cones and the respective outer cups are spaced apart by spacer rings, with the inner cones held against axial movement on the shaft by a tightening nut and with the outer cups held against axial movement in the housing by axial fixation means. With my bearing assembly, the external shaft portion 41 is disposed to withstand a heavy load.

What is claimed is:

1. In a housing having an internal bore, a shaft mounted within and radially spaced from said internal bore, at least first and second tapered roller bearing means mounted between said shaft and said internal bore, said at least first and second tapered roller bearing means being mounted side-by-side with respect to each other, said first tapered roller bearing means having a first cone mounted on a first portion of said shaft and a first cup mounted in a first portion of said bore, said second tapered roller bearing means having a second cone mounted on a second portion of said shaft and a second cup mounted in a second portion of said bore, shaft spacer means separating said cones on said shaft, bore spacer means separating said cups in said bore, shaft shoulder means on said shaft against which said first cone axially abuts, thread means on said shaft having surface means axially pressing against said second cone and securing said cones with the shaft spacer means therebetween on said shaft against axial movement, bore shoulder means in said bore against which said first cup axially abuts, and coinable increasing area means constituting axial fixation means abutting against said second cup and securing said cups with the bore spacer means therebetween in said bore against axial movement to accommodate for tolerance in matching the position of said second cup in said bore.

2. The structure of claim 1, wherein said housing has end closure means for said bore, said end closure means having projection means axially extending into said bore, said axial fixation means being disposed between said projection means and said second cup, said axial fixation means being axially fixable and resisting an axial thrust load greater than the axial thrust load to which said second bearing means may be subjected in operation.

3. The structure of claim 1, wherein said housing has end closure means for pressing said axial fixation means against said second cup.

References Cited

UNITED STATES PATENTS

| | | | |
|---|---|---|---|
| 2,227,697 | 1/1941 | Blood | 308—189 |
| 2,565,759 | 8/1951 | Danly et al. | 308—207 |
| 3,326,613 | 6/1967 | Renker | 308—189 |

MARTIN P. SCHWADRON, Primary Examiner

F. SUSKO, Assistant Examiner